United States Patent [19]

Neag

[11] Patent Number: 5,278,470
[45] Date of Patent: Jan. 11, 1994

[54] HOMOPOLAR MACHINE WHICH ACTS AS A DIRECT CURRENT (DC) HIGH VOLTAGE GENERATOR OR MOTOR

[76] Inventor: Zacharias J. Neag, Traubenstrasse 27, 7056 Weinstadt 2, Fed. Rep. of Germany

[21] Appl. No.: 839,353

[22] Filed: Feb. 20, 1992

[51] Int. Cl.[5] .......................................... H02K 31/00
[52] U.S. Cl. .................................. 310/178; 310/207; 310/208; 310/268
[58] Field of Search ...................... 310/178, 203, 102; 322/48

[56] References Cited

U.S. PATENT DOCUMENTS

| | | | |
|---|---|---|---|
| 547,069 | 10/1895 | Gorges | 310/178 |
| 742,600 | 10/1903 | Cox, Jr. | 310/178 |
| 1,271,061 | 7/1918 | Morse | 310/178 |
| 3,548,231 | 12/1970 | MacNab | 310/178 |
| 3,590,295 | 6/1971 | Appleton | 310/178 |
| 4,514,653 | 4/1985 | Batni | 310/178 |
| 5,142,181 | 8/1992 | Newell | 310/268 |

FOREIGN PATENT DOCUMENTS

| | | | |
|---|---|---|---|
| 0022129 | 1/1981 | European Pat. Off. | 310/178 |
| 4021588 | 1/1992 | Fed. Rep. of Germany | |
| 0516890 | 4/1921 | France | 310/178 |
| 0294211 | 3/1971 | U.S.S.R. | 310/178 |
| 1266621 | 3/1972 | United Kingdom | 310/178 |

OTHER PUBLICATIONS

Direct Current Machinery by R. G. Kloeffler et al.; New York, The Macmillan Co.; pp. 13-20; (no month) 1948.

Primary Examiner—R. Skudy
Attorney, Agent, or Firm—Synnestvedt & Lechner

[57] ABSTRACT

A homopolar machine for producing high voltage, direct current. The machine comprises a stator which supports the homopolar machine, a plurality of excitation coils disposed within the stator for producing magnetic flux so that the homopolar machine can produce direct current when in operation, a rotor rotationally disposed within the excitation coils for rotating through the magnetic flux when the homopolar machine is in operation to produce direct current, and a coil of a single length continuous conductor element disposed about the rotor such that a plurality of rotor conductor segments are formed wherein successive ones of the plurality of conductor segments are electrically connected such that an induced voltage and direct current are produced in the coil when the rotor and coil traverse through the magnetic flux during homopolar machine operation. Homopolar machines described herein are useful in a wide range of applications, operate with high voltages and allow straight transformation of a DC voltage. These machines also can operate as high voltage DC motors.

4 Claims, 2 Drawing Sheets

HOMOPOLAR MACHINE WHICH ACTS AS A DIRECT CURRENT (DC) HIGH VOLTAGE GENERATOR OR MOTOR

FIELD OF THE INVENTION

This invention relates generally to direct current producing machines. More specifically, this invention relates to homopolar machines which produce acyclic direct current.

BACKGROUND OF THE INVENTION

Magnetic machines, sometimes called "dynamos," are known for converting mechanical energy into electrical energy, or for the reverse process, converting electrical energy into mechanical energy. In the first case, the magnetic machine is called an "electrical generator." In the second case, the machine develops mechanical power, and is thus called a "motor."

Whether acting as a generator or a motor, magnetic machines function because of a relative motion between electrical conductors on a rotor or armature and a magnetic field. The magnetic field may be stationary and the electric conductors revolve through it, or the electrical conductors may be stationary and the magnetic field structure may revolve. It is also possible for both the conductors and the magnetic field to be in motion in a functioning magnetic machine.

In case of generator function, the relative motion between the electrical conductors and the magnetic field produces an induced electro-motive force, sometimes called an "EMF" or voltage, and an associated current in the active conductors. Generally, the EMF and current that are produced are alternating in direction, and so sometimes a "commutator" is used to make the electric current unidirectional in the external circuit of the magnetic machine. However, there are certain magnetic machines which do not have a commutator and in which the associated currents and voltages are not alternating. These types of magnetic machines are called "homopolar" machines, and are sometimes also called "acyclic dynamos."

In a homopolar machine having coaxial rotor conductors, as well as in other types of magnetic machines, the instantaneous EMF induced in a conductor having a length, L, moving with a velocity, V, within and perpendicular to a magnetic field density, B, is generally given as:

$$E = BLV,$$

which is the well known Faraday induction law for the relative motion between the electrical conductors and the magnetic flux. See, e.g., R. G. Kloeffler et al., Direct-Current Machinery, Chapter 2, p. 13 (1948), the teachings of which are specifically incorporated herein by reference.

The generalized induction equation in prior homopolar machines is known by those with skill in the art as:

$$E = \frac{-d\phi}{dt} + BLV,$$

where $\phi$ is the magnetic flux which can be dependent in time. For homopolar machines having disc rotors and radial conductors, $$E = \frac{-d\phi}{dt}$$

alone, where $\phi = B \cdot A$, and A is the area of the disc rotor. This is the well known Faraday/Lenz law of induction. Thus for the disc rotor machine, the induced EMF can be written as $$E = \frac{d}{dt}(B \cdot A) = B \frac{dA}{dt} = B\pi r^2 m$$

where r is the length of one rotor radial conductor segment and m is the rotational speed of the disc in turns/second.

Because of the construction of typical homopolar machines, the conductors on the rotor are adapted to always cut magnetic flux in the same direction. Due to this arrangement, the generated EMF and the current flow are steady and in the same direction at all times, which eliminates the need for a commutator and which avoids the difficulties which arise from reactance voltages.

Since the lengths of several individual rotor conductors of a homopolar machine are usually extremely short, only low voltages and high currents can be produced with current homopolar machines. Thus, typical homopolar machines have had voltage ratings of 3 volts at 6000 amps, and 3 volts at 4500 amps, for example.

Thus while the homopolar machine has heretofore been useful in low voltage applications, it has been virtually useless when high voltages are necessary, thereby forcing the electrical engineer to utilize a standard multipolar magnetic machine having a commutator which is expensive and inefficient. Alternatively, electrical engineers have used rotary converters which operate only at low voltages, or solid state converters which are complicated and expensive. These options are therefore generally not realistic for many DC power generation and transmission requirements, and so there does not currently exist a simple magnetic machine to provide a solution for generation of high DC voltage, for straight transformation of DC voltage, and which is operable for a wide variety of voltage applications.

SUMMARY OF THE INVENTION

The inventor of the subject matter herein disclosed and claimed has solved the aforementioned problems with the invention of a new homopolar machine for producing high voltage, direct current. This homopolar machine comprises stator means for supporting the homopolar machine, a plurality of excitation coils disposed within the stator means for producing magnetic flux so that the homopolar machine can produce direct current when in operation, rotor means rotationally disposed within the excitation coils for rotating through the magnetic flux when the homopolar machine is in operation to produce direct current, and a coil of a single length, continuous conductor element disposed about the rotor means such that a plurality of rotor conductor segments are formed wherein successive ones of said plurality of conductor segments are electrically connected such that an induced voltage and direct current are produced in the coil when the rotor and coil traverse through the magnetic flux during homopolar machine operation.

Homopolar machines provided in accordance with the present invention provide significant advantages over prior homopolar machines. The homopolar machines described herein are capable of generating high voltage, direct currents (HVDC) without the need of a commutator. These machines also provide direct transformation from low voltage, high currents to high voltage, low currents and vice-versa, and find application as DC generators or as DC motors which operate to produce or use, respectively, a wide range of current and high voltage values. Furthermore, with homopolar machines described herein, it is possible to reach the voltage over proportionality domain, that is, where the voltage can resonantly increase, in a much faster time as compared to prior homopolar machines.

These and other advantages will be more readily understood by reading the following detailed description, with reference to the accompanying drawings.

DETAILED DESCRIPTION OF PREFERRED EMBODIMENTS

Figure 1A:
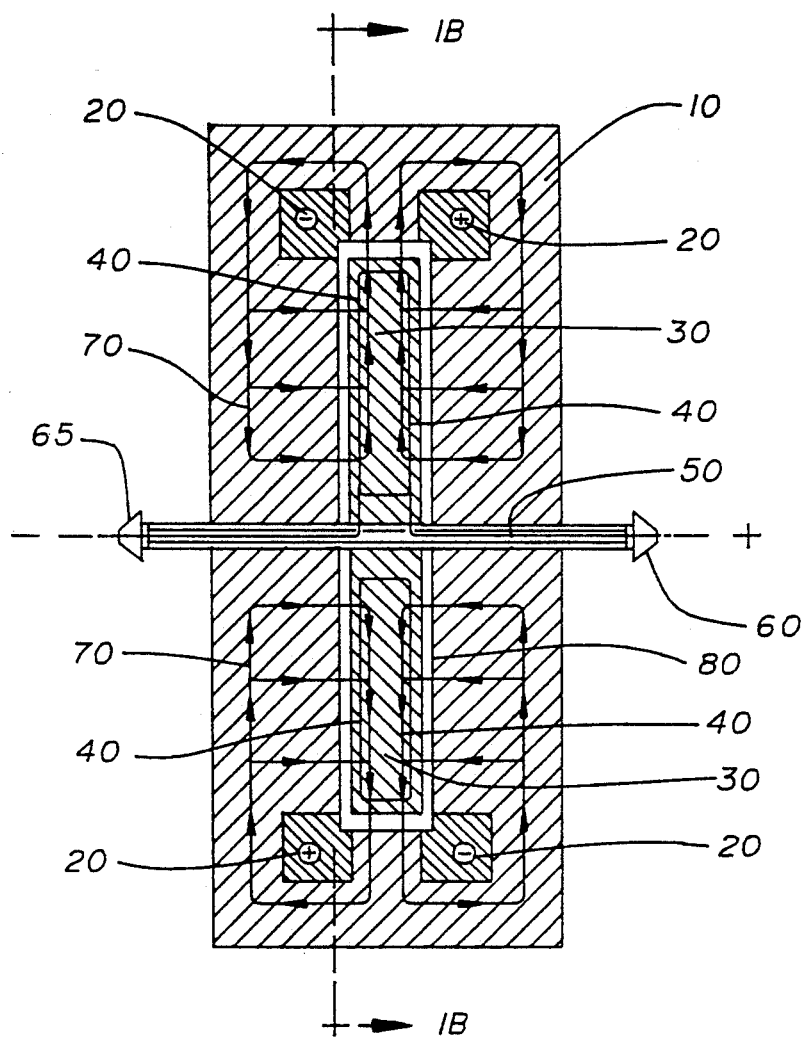
FIG. 1A is a cross-sectional view of a homopolar machine provided in accordance with the present invention.

Referring now to the drawings wherein like reference numerals refer to like elements, FIG. 1A shows a model of a homopolar machine wherein a voltage which is proportional to the applied magnetic flux density and the total length of the rotor radial conductor segments, to be discussed further herein, as well as the rotor turning speed, can be measured. A preferred embodiment, the model of the homopolar machine utilizes a very low magnetic flux in air and has small overall machine dimensions, but it will be readily recognized by those with skill in the art that a machine employing the principles described with reference to FIGS. 1A and 1B can be built to produce high voltage DC power on a commercial scale.

In a further preferred embodiment, stator means, shown at 10, is provided for supporting the homopolar machine and containing the magnetic flux. A plurality of excitation coils 20 disposed within the stator means preferably supplies the magnetic flux so that the homopolar machine can produce direct current when in operation. Rotor means 30 rotationally disposed within the excitation coils rotates through the magnetic flux when the homopolar machine is in operation to produce the direct current.

Preferably, a rotor coil 40 which is a single length, continuous conductor element is disposed about the rotor means 30 such that a plurality of rotor conductor segments are formed. Successive ones of the plurality of conductor segments are serially electrically connected so that an induced voltage, or EMF, and a direct current are produced in coil 40 when rotor means 30 and coil 40 traverse through the magnetic flux during the homopolar machine operation. The machine further preferably comprises a machine axis or shaft 50 on which rotor means 30 and coil 40 are disposed. The machine shaft 50 allows rotor means 30 to be mounted thereon within the stator 10 so that the rotor means 30 and coil 40 can rotate through the magnetic flux supplied by the excitation coils 20. A positive pole 60 is conventionally attached to one end of the machine shaft 50, while a negative pole 65 is also conventionally attached to the other end of the machine shaft 50.

It will be recognized by those with skill in the art that rotor means 30 can be a disk-type rotor, having a thickness, and further preferably comprises iron sheets or other materials having a high magnetic permeability. Stator means 10 also preferably comprises iron sheets or other materials having a high magnetic permeability.

For schematic purposes, the directions 70 of the magnetic flux paths produced by excitation coils 20 are shown, and thus it can be seen that rotor disk 30 cuts the magnetic flux in the same direction at all times during rotation. In accordance with the standard construction of a homopolar machine, an air gap 80 is provided between rotor disk 30 and stator 10 through which rotor disk 30 rotates during homopolar machine operation.

Figure 1B:
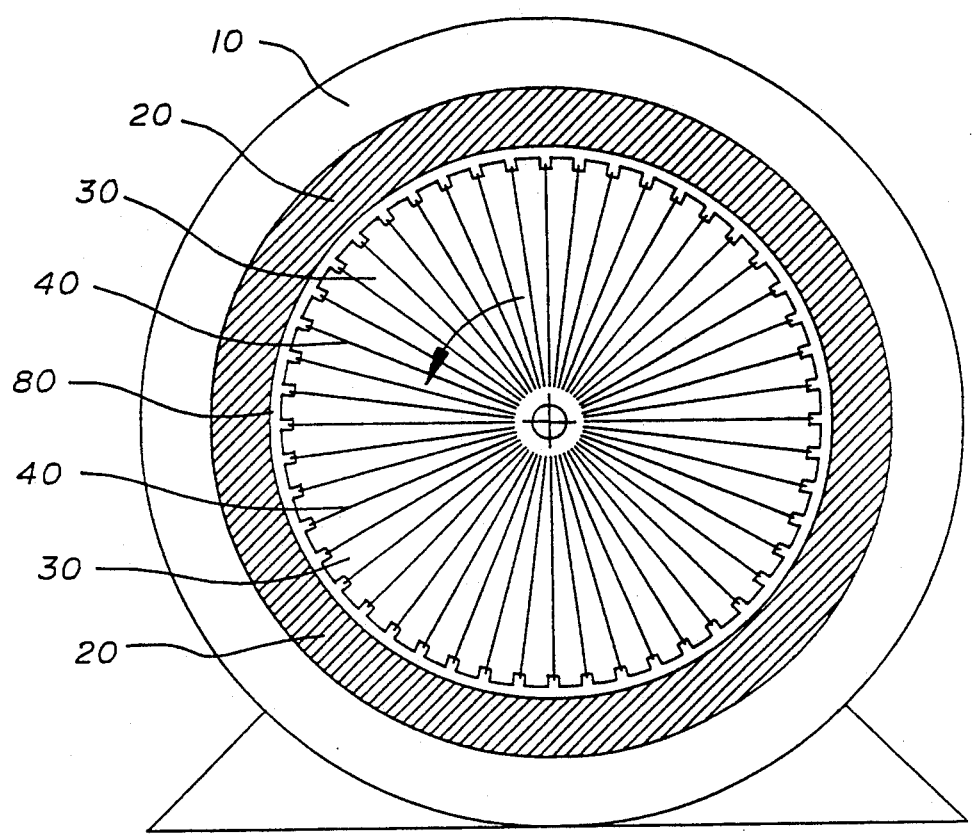
FIG. 1B is an elevation view of a homopolar machine provided in accordance with the present invention taken along the B—B line of FIG. 1A.

Referring now to FIG. 1B, the stator 10 preferably holds two excitation coils shown at 20 which form a ring and which lie coaxially with machine axis 50. The excitation coils are supplied in a conventional manner by a DC source, and produce two oppositely directed magnetic fluxes. In accordance with the invention, rotor disk 30 holds coil 40 which is a single, continuous conductor that preferably wraps up the whole disk, from the center of a first side of the disk, across the disk periphery, and back to the disk center continuously on a second side of the disk. In this fashion, several non-interrupted radial segments on both sides of the disks are created, and several frontal segments on the disk's periphery are also created thereby forming a toroidal coil.

By means of the constant turning of rotor disk 30 through the magnetic field produced by the excitation coils, the magnetic flux which is cut by each rotor radial conductor segment varies with the turning angle so that a DC internal voltage or EMF is generated according to the Faraday induction law. Since the two excitation fluxes are opposite in direction, the internal voltages in any two successive radial segments on the two sides of the rotor disk 30 have the same direction so that the internal voltages of all the radial conductor segments re arithmetically added to a total resultant voltage. The voltages and currents which are induced in the radial rotor conductor segments can have a correspondingly wide range of values, and since the voltages in each segment are arithmetically added to produce a total conductor voltage in the coil 40, it is possible to generate a very large induced EMF with the homopolar machine provided in accordance with the present invention. This has heretofore not been achievable with prior homopolar machines and so homopolar machines provided in accordance with the present invention solve a long-felt need in the art for homopolar machines which have a simple construction, which eliminate the need for a commutator, and which produce high voltages for a wide variety of applications.

Since the internal voltages of all the rotor radial conductor segments are arithmetically added by virtue of the fact that each radial segment on one side of the rotor disk is electrically connected to the prior radial segment, on the other side of the rotor disk the aforementioned high voltages can be generated with a homopolar machine in accordance with the present invention. This allows the machine to be used in a wide range of applications requiring high voltages, allows the machine to provide straight transformation of a DC voltage, and further allows the machine to operate either as a high voltage DC generator, or as a high voltage DC motor.

These results have also not heretofore been achieved in the art.

The air gap 80 is typically only a few millimeters wide. In a commercial machine which will operate according to the principles of the present invention, the total length of the radial rotor conductors could reach on the order of about 1,000 meters or greater. Thus the ratio of the total length of radial rotor conductor segments to the air gap when the rotor total length is about ,1000 meters and the air gap width is 1 millimeter, is on the order of about 1,000,000. Because of this large ratio, the over proportionality voltage domain is reached much quickly and efficiently with homopolar machines provided in accordance with the present invention what in the prior homopolar machines was not possible. This occurs since the higher ratio corresponds to a higher ratio of the speed of light to the relativistic speed of the conductors rotating through the magnetic flux. Therefore the relativistic effects which are produced allow the over proportionality domain of the induced voltage to be reached in homopolar machines provided in accordance with the present invention. The ratio between the total radial rotor conductors segments and the air gap could be as low as about 1,000,000, and as high as about 100,000,000 in accordance with the present invention, wherein the higher the ratio, the quicker the voltage over proportionality domain will be reached.

There have thus been described certain preferred embodiments of homopolar machines provided in accordance with the present invention. While preferred embodiments have been described and disclosed, it will be recognized by those with skill in the art that modifications are within the true spirit and scope of the invention. The appended claims are intended to cover all such modifications.

What is claimed is:

1. A homopolar machine for producing high voltage, direct current comprising:
    stator means for supporting the homopolar machine;
    two excitation coils disposed within the stator means for producing magnetic flux so that the homopolar machine can produce direct current when in operation;
    rotor means rotationally disposed within the excitation coils which rotates through the magnetic flux when the homopolar machine is in operation for producing direct current, wherein the rotor means further comprises a disk having a center, a thickness and a periphery; and
    a single length, continuous conductor element wrapped repeatedly around the disk radially from the center to the periphery on a first side of the disk, radially from the periphery to the center on a second side of the disk, again radially from the center to the periphery on the first side of the disk, forming a toroidal coil around the disk, each portion of said conductor element extending radially from the center to the periphery on the first side of the disk and radially from the periphery to the center on the second side of the disk forming a conductor segment, such that a plurality of conductor segments are formed wherein successive ones of said plurality of conductor segments are serially electrically connected such that an induced voltage and direct current are produced in the continuous conductor element when the rotor means and conductor segments traverse through the magnetic flux during homopolar machine operation, further comprising an air gap between the rotor means and the two excitation coils, the air gap having a width, and wherein a ratio of a total length of the conductor segments to the width of the air gap is between about 1,000,000 and about 100,000,000.

2. The homopolar machine recited in claim 1 wherein two excitation coils are disposed within the stator means such that a first of the excitation coils produces a magnetic flux in a direction opposite to a direction of a magnetic flux produced by a second of the excitation coils.

3. The homopolar machine recited in claim 2 wherein the magnetic fluxes produced by the two excitation coils act perpendicularly to the disk whereby when the disk rotates, internal voltages having directions are generated in the conductor segments of the continuous conductor element and the directions of the voltages are in a same direction.

4. The homopolar machine recited in claim 3 wherein a ratio of the total length of the conductor segments to the width of the air gap is about 1,000,000.

* * * * *